United States Patent [19]

Kono

[11] 4,019,173
[45] Apr. 19, 1977

[54] SYSTEM FOR RECOGNITION OF SHAPE PATTERNS

[75] Inventor: Hidehiko Kono, Akishima, Japan

[73] Assignee: Agency of Industrial Science & Technology, Tokyo, Japan

[22] Filed: June 9, 1976

[21] Appl. No.: 694,382

Related U.S. Application Data

[63] Continuation-in-part of Ser. No. 594,040, July 8, 1975, abandoned.

[30] Foreign Application Priority Data

July 8, 1974  Japan ............................. 49-78003

[52] U.S. Cl. ..................... 340/146.3 AE; 250/202
[51] Int. Cl.² .......................................... G06K 9/00
[58] Field of Search .......... 340/146.3 AE; 250/202; 318/577

[56] References Cited

UNITED STATES PATENTS

| | | | |
|---|---|---|---|
| 3,366,735 | 1/1968 | Hecker | 340/146.3 AE |
| 3,576,980 | 5/1971 | Doyle | 340/146.3 AE |
| 3,599,149 | 8/1971 | Pardoe | 340/146.3 AE |

*Primary Examiner*—Leo H. Boudreau
*Attorney, Agent, or Firm*—Oblon, Fisher, Spivak, McClelland & Maier

[57] ABSTRACT

A system for the recognition of shape patterns is disclosed which comprises reading the projection on a reference line of a shape pattern by means of a pattern input device, converting the output of the pattern input device into projection values, transferring the projection values to two stages of differential circuits, continuing the whole procedure described above while the postural angle of the shape pattern is changed until the shape pattern completes one rotation, detecting the fact that each side of the polygon of the shape pattern has fallen exactly into the direction of projection in accordance with the change in the initial value of the output from said differential circuits, causing the rotated postural angle of the shape pattern and the projection value existing at the time of said detection to be memorized and accomplishing the recognition of the shape pattern on the basis of the memorized data.

3 Claims, 5 Drawing Figures

Fig. 1
(A)
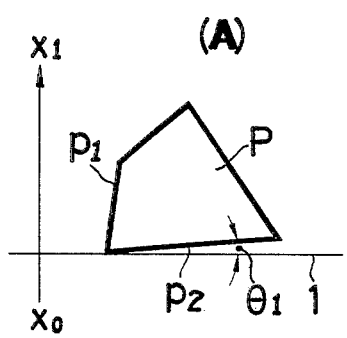
(B)
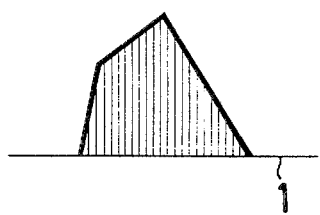
(C)
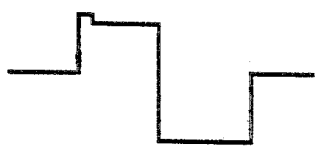
(D)
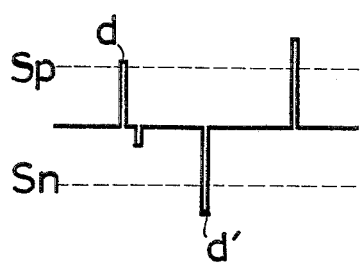
Fig. 2
(A)
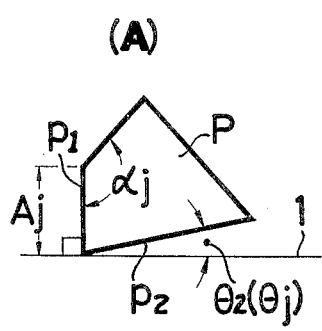
(B)
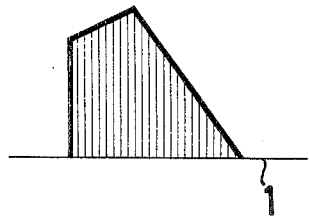
(C)
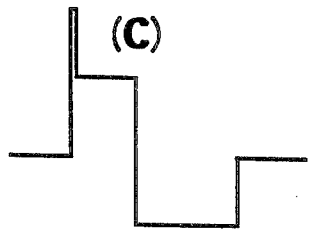
(D)
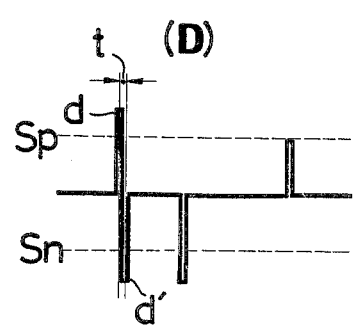
Fig. 3
(A)
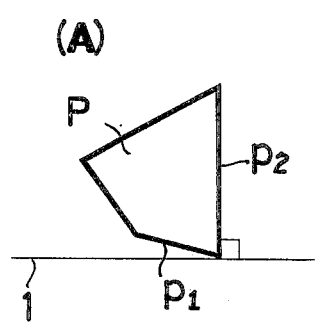
(B)
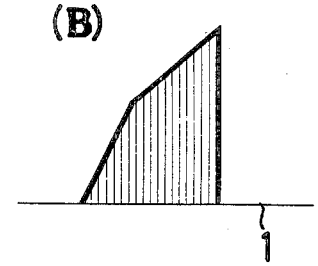
(C)
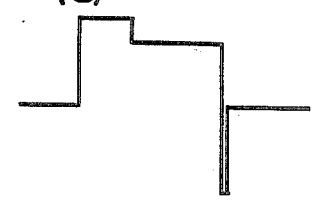
(D)
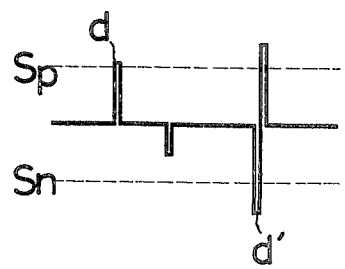

SYSTEM FOR RECOGNITION OF SHAPE PATTERNS

REFERENCE TO COPENDING APPLICATION

This is a continuation-in-part application of our copending application U.S. Ser. No. 594,040 filed July 8, 1975, now abandoned.

BACKGROUND OF THE INVENTION

The present invention relates to a system for the recognition of shape patterns. More particularly, this invention relates to a system for the recognition of polygonal shape patterns.

According to the conventional method for shape pattern recognition, the general procedure usually followed comprises recognizing the outline of the shape of a given article by means of space differential, converting said outline into a corresponding figure of fine component segments, calculating an edge function from said component segments by means of minimum square method and determining the edge consequently. Pattern recognition, however, is accomplished more easily and more accurately when shape parameters such as component dimensions and corner angles are recognized directly to the maximum degree permissible than when such shape parameters are determined indirectly as is done by the conventional method. And the method of direct recognition enjoys greater value of utility.

An object of the present invention is to provide a system for the recognition of shape patterns, designed to accomplish such direct recognition of shape patterns by simple means.

SUMMARY OF THE INVENTION

To accomplish the object described above, the system for recognition of shape patterns according to the present invention comprises causing the projection on a reference line of a shape pattern subjected to recognition and set in a desired postural angle relative to the reference line to be read out by a pattern input device, converting the output from said pattern input device into projection values differentiating said projection values twice in two stages of differential circuits and continuing the whole procedure described above while having the postural angle of the shape pattern repeatedly rotated by a prescribed value until the shape pattern completes one rotation around a center.

As the forward side of a given shape pattern reaches the point of forming a right angle with the reference line or of conforming with the direction of scanning, sharp positive and negative variations appear in the initial values of the output from the second-stage differential circuit and the projection value and the postural angle of rotation at that moment are stored in memory. Desired recognition of this shape pattern is accomplished on the basis of the positive and negative variables obtained during one complete rotation of the article around a center, viz. from the number of sides of the pattern, the length of each of said sides and the postural angle of rotation.

As described above, the system according to the present invention can directly recognize the article subjected to recognition. It provides extremely simple and yet accurate recognition of the article since it effects the required detection by subjecting the output of the pattern input device to differentiation twice and utilizing only the initial value of the second-stage differentiation.

The other objects and characteristic features of the present invention will become apparent from the description to be given in further detail hereinafter with reference to the accompanying drawing.

BRIEF DESCRIPTION OF THE DRAWINGS

FIGS. 1–3 are explanatory diagrams illustrating the sequence of processing given to the shape pattern according to the present invention.

DESCRIPTION OF THE PREFERRED EMBODIMENTS

Figure 4:
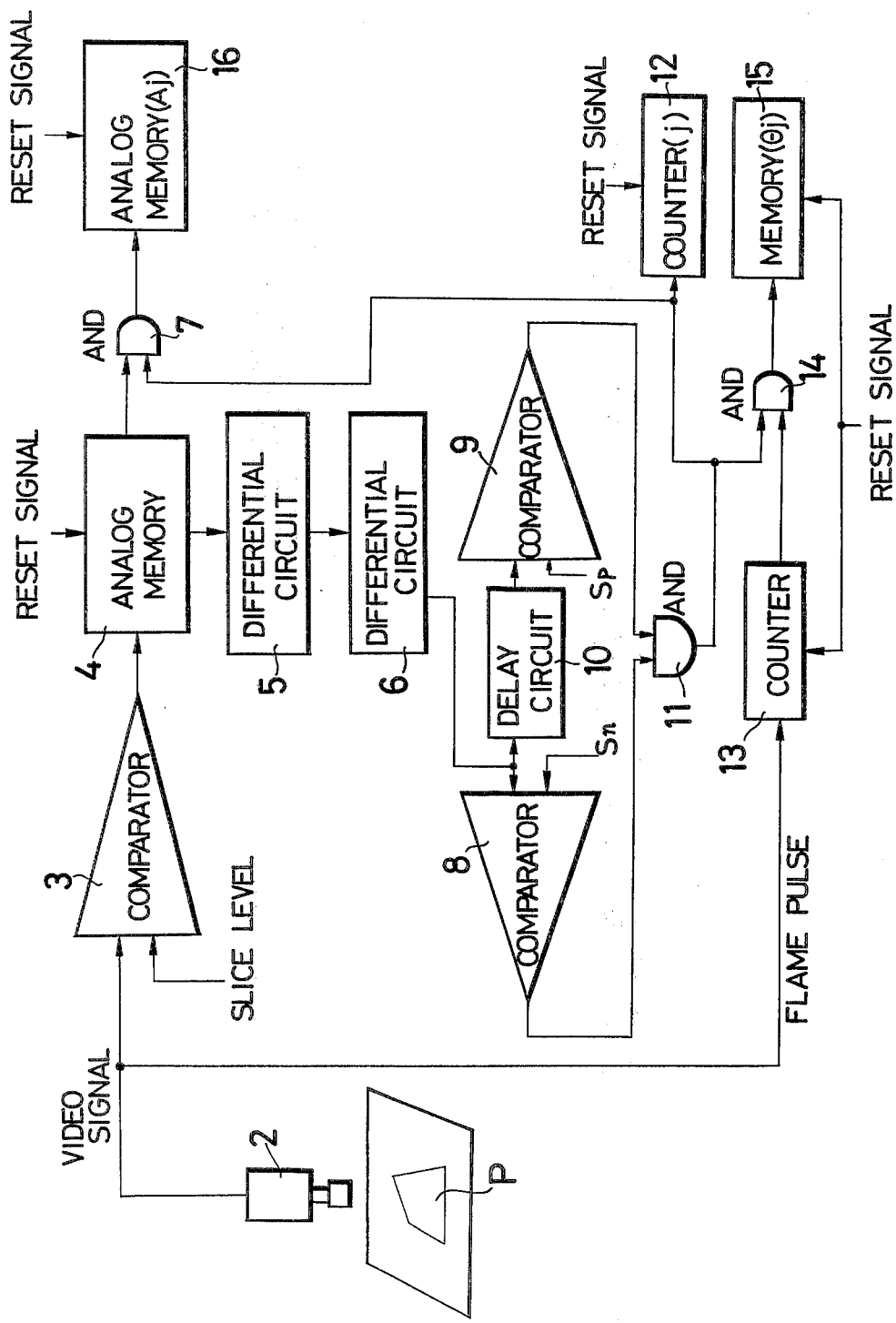
FIG. 4 is a block diagram illustrating one preferred embodiment of the system according to this invention.

Referring to the drawing, a shape pattern subjected to recognition as shown in FIG. 1(A) is set in position at a given postural angle $\theta_1$ relative to the reference line 1. A pattern input device 2 (FIG. 4) reads the projection of the shape pattern on reference line 1 in the direction from $x_0$ to $x_1$. As the pattern input device 2, there can be utilized an ITV camera, an image recording device having a multiplicity of minute sensors arrayed or some other similar device. The scanning lines in each frame delivered from said pattern input device 2 are forwarded sequentially to the comparator 3, wherein the scanning-line signals are compared with a preset slice level voltage and converted into fixed amplitude analog signals of corresponding lengths. In this manner, variations in the signals generated such as by dirt or other foreign matter adhering to the image or signals generated such as by external noises are eliminated.

The output from the comparator 3 is forwarded to an analog memory 4. Consequently, values corresponding to the individual scanning lines of the projected figure of the shape pattern P, that is, the projection values as illustrated in FIG. 1(B), are sequentially received by the analog memory 4. The projection value corresponding to each of such scanning lines is forwarded from the analog memory 4 to the first-stage differential circuit 5 and the AND circuit 7. The signal thus received in the first-stage differential circuit 5 undergoes differentiation and is converted into a differential output value as shown in FIG. 1(C). This differential value is further delivered to and again subjected to differentiation in the second-stage differentiation circuit 6, with the result that a differential output value like the one illustrated in FIG. 1(D) is obtained. The output signal which results from said second differentiation is forwarded to a comparator 8 and via a delay circuit 10 to a comparator 9. The comparator 8 forwards an output signal to an AND circuit 11 only when there is a second differential value exceeding a preset negative threshold value $Sn$. The comparator 9 forwards an output signal to the AND circuit 11 only when there is a second differential value exceeding a preset positive threshold value $Sp$.

When the output signal from the differential circuit 6 is like the one illustrated in FIG. 1(D), the output value on the positive side is detected by the comparator 9 to be greater than the threshold value $Sp$ so that an output signal is delivered from the comparator 9 to the AND circuit 11. In the comparator 8, the value on the negative side of the output from the differential circuit 6 earlier by an interval of $t$ determined by the delay circuit 10 is smaller than the threshold value $Sn$ so that no output signal is delivered to the AND circuit 11. The AND circuit 11, therefore, generates no output signal.

As the processing of the shape pattern at the postural angle of $\theta_1$ is completed, either the pattern input device 2 or the article subjected to pattern recognition is rotated by a prescribed angle $\Delta\theta$ and the frame signal obtained at the newly assumed postural angle is forwarded to the analog memory 4 and the counter 13 to renew the contents of the memory.

Now assume that the postural angle of the article P subjected to pattern recognition relative to the reference line 1 is changed to $\theta_2$ is illustrated in FIG. 2(A) and one side $p_1$ of said shape pattern P reaches the point of forming a right angle with said reference line 1 or conforming to the direction of scanning. At this moment, projection values like the ones illustrated in FIG. 2(B) are received by the analog memory 4. As this signal is subjected to differentiation twice in the differential circuits 5 and 6, there is obtained a differential value involving initial sharp positive and negative variations as illustrated in FIG. 2(D). This differential value is delayed by an interval of $t$ in the delay circuit 10 and then forwarded to the comparator 9. The comparator 9 forwards an output signal to the AND circuit 11 only when the differential value exceeds the value $Sp$. The comparator 8 similarly forwards an output signal to the AND circuit 11 only when the differential value exceeds the value $Sn$.

The initial differential values obtained from the second-stage differential circuit 6 at the moment that said one side $p_1$ of the article P subjected to pattern recognition reaches the point of forming a right angle with the reference line 1 are such that the differential value $d$ on the positive side becomes large and the differential value $d'$ on the negative side also becomes large after a delay of an interval of $t$. Consequently, the comparators 8 and 9 simultaneously are forwarded respective output signals to the AND circuit 11 and the resultant output signal of the AND circuit 11 is forwarded to the AND circuit 7, a counter 12 and an AND circuit 14.

It is when one side of the shape pattern subjected to pattern recognition reaches the point of conforming with the direction of scanning that said sharp positive and negative variations appear in the initial values of the second-stage differential output and the AND circuit 11 consequently sends out an output signal. When this output signal is forwarded to the AND circuit 7, the analog memory 4 causes the analog signal corresponding to the scanning-line signal issued at that very moment to be forwarded to the memory circuit 16, with the result that the length $A_j$ of the side falling exactly in the direction of scanning is put to memory. In the counter 12, a count is taken of the output signals from the AND circuit 11. The number $j$ of sides (or angles) of the article subjected to pattern recognition can be found from the numeral which is registered in said counter 12 after the article has been completely rotated (360°). The counter 13 takes a count of the frame signals and delivers the resultant output to the AND circuit 14, which sends out an output signal to the memory 15 only when the AND circuit 14 simultaneously issues an output signal. Thus, information is recorded as to which of the frames of pulse signals contains the signals generated when one side of the article has fallen exactly in the direction of scanning. The angle $\theta_j$ formed between this particular side and the next side can be found by taking a count of the frames of pulse signals.

As the shape pattern P is further rotated until the rear-end side $p_2$ of the shape pattern falls exactly in the direction of scanning as illustrated in FIG. 3(A), sharp positive and negative variations appear in the final values of the output from the second-stage differential circuit 6 as shown in FIG. 3(D). Since the positions of the positive and negative variations are reversed from those of the initial values, the output signal from the comparator 9 reaches the AND circuit 11 later than the output signal from the comparator 8. Thus, the AND circuit 11 does not issue an output signal.

Figure 5:
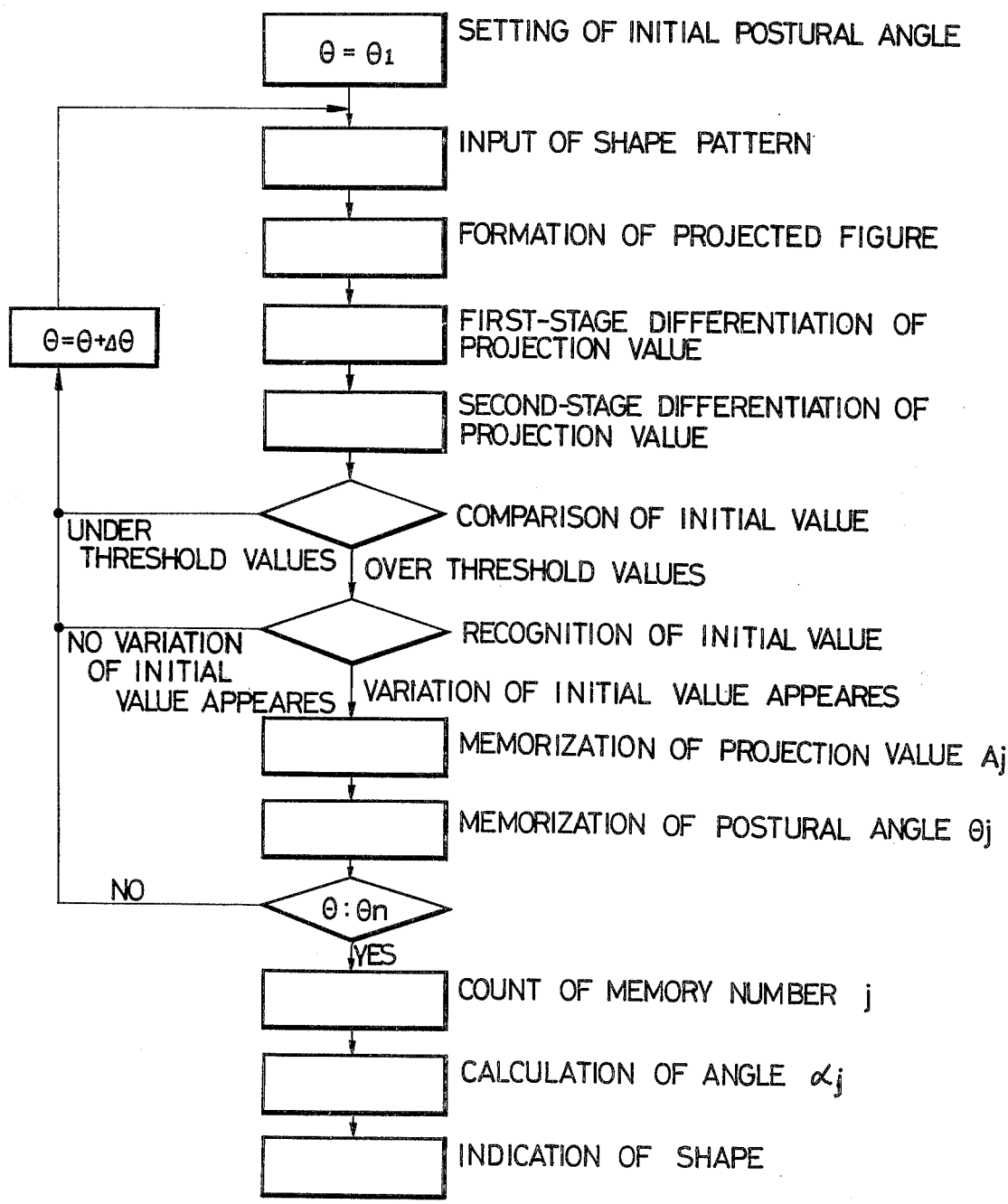
FIG. 5 is a flow chart of the system according to this invention.

When the output value of the second-stage differential circuit is obtained as described above, sharp positive and negative variations appear in the initial values of the second-stage differential output at the moment that one forward side of the polygon of the shape pattern subjected to pattern recognition falls exactly in the direction of scanning. Such sharp positive and negative variations fail to appear in the initial values of said output of the second-stage differential circuit when none of the sides of said polygon falls in the direction of scanning or when the rear-end side of the polygon falls exactly in the direction of scanning. The whole operation described above is carried out in accordance with the procedure shown by the block diagram of FIG. 5 while having the postural angle $\theta_1$ of the shape pattern gradually changed by rotating the shape pattern or the ITV camera of the pattern input device by prescribed angles one at a time until the rotation covers one complete circle. In this operation, the direction of a given side falling in the direction of said projection can be found by detecting the postural angle $\theta_j$ of rotation at the moment that positive and negative variations appear in the initial output values. Also the length of the side which has fallen in the direction of projection can be found from the projection value $A_j$ read out at that moment.

The reference line 1 with reference to which the postural angle is measured may be fixed in a horizontal direction, for example. The center of rotation of the shape pattern or the ITV camera is not necessarily required to coincide with the true center of the shape pattern.

The magnitude of the angle of rotation of the shape pattern is closely related to the number of scanning lines and the threshold values $Sn$ and $Sp$ of the comparators 8 and 9.

The positive and negative variations in the output of the differential circuit 6 becomes very sharp at the moment that one side of the shape pattern falls exactly in the direction of scanning. For this reason, the unit angle of rotation should be as small as possible, although the time required for the pattern recognition increases with the decreasing magnitude of said unit angle of rotation. If the unit angle of rotation is increased and the threshold value are heightened, there is a possibility that one side of the shape pattern may fail to fall exactly in the direction of the value of projection, in which case the output of the positive and negative variation from the differential circuit 6 is so small that the side may escape detection. For practical purposes, therefore, it is desirable that the unit angle of rotation be selected in the range of from 3° to 5° and the slice level be fixed accordingly in proportion thereto.

There is hereinbefore described a preferred embodiment wherein the shape pattern or pattern input device is intermittently rotated at a fixed angle. It is also possible to recognize the shape pattern by slowly and continuously rotating the shape pattern or pattern input device.

When the processing is carried out as described above, the postural angles $\theta_2, \theta_3 \ldots \theta_j \ldots \theta_m$ which the sides of the polygon of the shape pattern form when they fall in the direction of projection are put to storage in the memory 15 and the lengths $A_2, A_3 \ldots A_j \ldots A_m$ of said sides in side postural angles are put to storage in the memory 16.

After the fact that the postural angle of the shape pattern has completed one rotation, namely, the fact that the work of processing has proceeded to the extent of $\theta = \theta_n$ ($n = 360°/\Delta\theta$) has been detected, the number of the sides of said polygon is found by counting the number $j$ of the items of data memorized at the counter 12 corresponding to the number of changes appearing in the initial value of the differential output and, at the same time, the angle $\alpha_j$ of the corner of the polygon is calculated on the basis of the rotated postural angle $\theta_j$ stored in the memory 15 at the time of said appearance of changes in the initial value. Moreover, the shape of the polygon the sides of which are fixed on the basis of corresponding projection values $A_j$ stored in the memory 16 is displayed by suitable means.

The angle of apex $\alpha_j$ at the $j$th corner of the polygon can be found in accordance with the relation expressed by the following equation. In this connection, the postural angle, $\theta_i$, is calculated by the equation, $\theta_i = \theta_1 + (i - 1) \times \Delta\theta$.

If $1 \leq j < m$, $$\alpha_j = 180 - (\theta_{j+1} - \theta_j)$$

If $j = m$, $$\alpha_j = -180 - (\theta_i - \theta_m)$$

wherein, $m$ denotes the maximum count of the changes which have appeared in the individual initial values of the differential output through one complete rotation of the postural angle and, therefore, corresponds to the number of corners contained in the shape pattern and $\theta_j$ denotes the postural angle which is assumed when the $j$th change appears in the corresponding initial value of the differential output. When a circular shape pattern is to be subjected to recognition by the method of recognition described above, changes appear in the initial value of differential output for each increment in the rotation of the postural angle and the projection value detected for each increment is $\theta$. In this case, the size of the circle of the shape pattern can be found as by measuring the width of projection and consequently determining the diameter of the circle.

The system for pattern recognition described above utilizes, for the recognition of pattern, only those changes which appear in the individual initial values of differential output. However changes can occur in the corresponding final values of differential output. In the case of a shape pattern containing concaves, changes can occur at intervals therebetween. The rotated postural angles and the projection values which are found when such changes of differential output are involved can, therefore, also be utilized for the recognition of shape patterns in conjunction with those which are found where changes occur in the initial values.

As described in detail above, the system for pattern recognition according to the present invention is designed to determine the direction of each side of the polygon of a given shape pattern on the basis of the change in the initial value of two-stage differential output of the projection value, find the length of said side on the basis of the projection value itself existing at that time and display the shape directly in terms of the values of output thus determined. This system, therefore, enjoys various advantages such as, for example, extremely simple recognition processing, usability of analog processing and short processing time. It proves particularly suitable for recognition of the shape of industrial parts, etc.

What is claimed is:

1. A system for recognition of a shape pattern, which comprises
   a. causing a pattern input device to read the projection on a reference line of the shape pattern of an article subjected to pattern recognition and set in position at a given postural angle with reference to said reference line,
   b. converting the resultant output from the pattern input device into corresponding projection values,
   c. subjecting said projection values to differentiation twice in two stages of differential circuits,
   d. continuing the whole procedure described in steps (a), (b) and (c) until the rotation thereof covers one complete circle,
   e. detecting the fact that each side of the polygon of the shape pattern has fallen exactly into the direction of projection in accordance with the change in the initial value of the output from said differential circuits,
   f. putting to memory the rotary postural angle of the shape pattern and the projection value existing at the time of said detection and
   g. accomplishing the recognition of shape pattern on the basis of the rotated postural angle and the projection value obtained as described above.

2. The system for recognition of shape pattern according to claim 1, wherein analog signals corresponding to the projection values of the article subjected to pattern recognition are used as the output of the pattern input device.

3. The system for recognition of shape pattern according to claim 1, wherein the positive side value and the negative side value of the initial output from the second-stage differential circuit are simultaneously compared with preset threshold values.

* * * * *